US009719362B2

(12) United States Patent
Rana et al.

(10) Patent No.: US 9,719,362 B2
(45) Date of Patent: Aug. 1, 2017

(54) TURBINE NOZZLES AND METHODS OF MANUFACTURING THE SAME

(71) Applicant: HONEYWELL INTERNATIONAL INC., Morristown, NJ (US)

(72) Inventors: Rajiv Rana, Tempe, AZ (US); Ardeshir Riahi, Scottsdale, AZ (US); Bradley Reed Tucker, Chandler, AZ (US); David Chou, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 876 days.

(21) Appl. No.: 13/869,085

(22) Filed: Apr. 24, 2013

(65) Prior Publication Data
US 2014/0321965 A1 Oct. 30, 2014

(51) Int. Cl.
*F01D 5/14* (2006.01)
*F01D 9/06* (2006.01)
*F01D 5/18* (2006.01)

(52) U.S. Cl.
CPC ............. *F01D 9/065* (2013.01); *F01D 5/187* (2013.01); *F05D 2260/201* (2013.01); *F05D 2260/202* (2013.01); *Y02T 50/676* (2013.01)

(58) Field of Classification Search
CPC ....... F01D 9/065; F01D 9/06; F05D 2260/201
See application file for complete search history.

(56) References Cited

U.S. PATENT DOCUMENTS

| 3,032,314 | A | * | 5/1962 | David | F01D 5/182 |
| | | | | | 416/90 R |
| 3,628,880 | A | * | 12/1971 | Smuland | F01D 5/189 |
| | | | | | 415/115 |
| 4,017,213 | A | | 4/1977 | Przirembel | |
| 4,118,146 | A | | 10/1978 | Dierberger | |
| 4,712,979 | A | | 12/1987 | Finger | |
| 4,800,718 | A | * | 1/1989 | Zimmerman | F02K 1/822 |
| | | | | | 239/127.3 |
| 5,048,288 | A | | 9/1991 | Bessette et al. | |
| 5,533,864 | A | | 7/1996 | Nomoto et al. | |
| 5,634,766 | A | | 6/1997 | Cunha et al. | |
| 6,120,249 | A | | 9/2000 | Hultgren et al. | |
| 6,146,091 | A | | 11/2000 | Watanabe et al. | |
| 6,237,344 | B1 | | 5/2001 | Lee | |

(Continued)

Primary Examiner — Gregory Anderson
Assistant Examiner — Jason Fountain
(74) Attorney, Agent, or Firm — Lorenz & Kopf, LLP

(57) ABSTRACT

A turbine nozzle assembly includes an inner circumferential support platform, an outer circumferential support platform, and a plurality of airfoil vanes disposed between the inner circumferential support platform and the outer circumferential support platform. The turbine nozzle assembly further includes a plurality of impingement plates disposed along a radially outer surface of the outer circumferential support platform or a radially inner surface of the inner circumferential support platform, and a plurality of gap-maintaining features disposed between the plurality of outer or inner circumferential support platforms and the plurality of impingement plates. Each gap-maintaining feature of the plurality of gap-maintaining features is provided at a height such that a cooling air flow space is maintained between the plurality of outer or inner circumferential support platforms and the plurality of impingement plates.

17 Claims, 7 Drawing Sheets

(56) References Cited

U.S. PATENT DOCUMENTS

| | | | |
|---|---|---|---|
| 6,375,415 B1 | 4/2002 | Burdgick | |
| 6,478,540 B2 | 11/2002 | Abuaf et al. | |
| 6,659,714 B1 | 12/2003 | Tiemann | |
| 7,219,498 B2 | 5/2007 | Hadder | |
| 7,524,163 B2 | 4/2009 | Self et al. | |
| 7,527,470 B2 | 5/2009 | Guimbard et al. | |
| 7,789,125 B2 | 9/2010 | Mayer et al. | |
| 8,069,648 B2 | 12/2011 | Snyder et al. | |
| 8,109,724 B2 | 2/2012 | Malecki et al. | |
| 8,137,056 B2 | 3/2012 | Fujimoto et al. | |
| 8,353,663 B2 | 1/2013 | Arzel et al. | |
| 9,145,789 B2 * | 9/2015 | Adavikolanu | F01D 11/24 |
| 9,238,969 B2 * | 1/2016 | Batt | F01D 9/041 |
| 2012/0082550 A1 | 4/2012 | Harris, Jr. et al. | |
| 2012/0107134 A1 | 5/2012 | Harris, Jr. et al. | |
| 2012/0272521 A1 | 11/2012 | Lee et al. | |

\* cited by examiner

TURBINE NOZZLES AND METHODS OF MANUFACTURING THE SAME

STATEMENT REGARDING FEDERALLY SPONSORED RESEARCH OR DEVELOPMENT

This invention was made with Government support under W911W6-08-2-0001 awarded by the U.S. Army. The Government has certain rights in the invention.

TECHNICAL FIELD

The inventive subject matter generally relates to turbine engine components, and more particularly relates to turbine nozzles and methods of manufacturing turbine nozzles.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary turbine vanes. The gas flow deflects off of the vanes and impinges upon turbine blades of a turbine rotor. A rotatable turbine disk or wheel, from which the turbine blades extend, spins at high speeds to produce power. Gas turbine engines used in aircraft use the power to draw more air into the engine and to pass high velocity combustion gas out of the gas turbine aft end to produce a forward thrust. Other gas turbine engines may use the power to turn a propeller or an electrical generator.

Typically, the stationary turbine vanes of the turbine nozzle extend between an inner support platform and an outer support platform. The inner and outer support platforms define a portion of the flowpath along which the combustion gases travel. In some cases, to simplify manufacture of the turbine nozzle, the inner and/or outer support platforms along with the vanes are initially formed as segments, and the segments are subsequently assembled together to form a full ring or bonded together. In other cases, the vanes are bi-cast with the inner and outer rings, so that the rings and the vanes form a single, unitary structure.

Although the aforementioned turbine nozzles operate adequately under most circumstances, they may be improved. In particular, requirements for advanced turbine engines calls for increased specific power and reduced specific fuel consumption. These requirements can be met through the use of increased turbine inlet temperatures and increased cycle pressure ratios. However, as the turbine inlet temperature increases, components such as the turbine vanes and blades are exposed to hotter gas temperatures that may exceed the component material capabilities. As such, these turbine components need to be cooled by using air from the exit of the compressor, which bypasses the combustor portion of the engine.

There are various potential of using the compressor exit air to cool the turbine components. First, such operation results in less air being available to cool the combustor, which may reduce combustor durability. Second, another potential effect of air not going through the combustor is higher turbine inlet temperatures, which may lessen the durability of the turbine hardware. Further, because the cooling air is not generating useful work, the result is a higher overall engine specific fuel consumption. To avoid such potential effects, it is desirable to achieve optimum cooling scheme designs in order to minimize cooling flow requirements without compromising the durability of the components.

Accordingly, it is desirable to have an improved turbine nozzle that has improved cooling such that it may operate at higher temperatures without the need for increased cooling flow. It is further desirable to provide such an improved turbine nozzle that is capable of being manufactured using conventional manufacturing techniques. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Turbine nozzles and methods of manufacturing the turbine nozzles are provided. In an embodiment, by way of example only, a turbine nozzle assembly includes an inner circumferential support platform, an outer circumferential support platform, and a plurality of airfoil vanes disposed between the inner circumferential support platform and the outer circumferential support platform. The turbine nozzle assembly further includes a plurality of impingement plates disposed along a radially outer surface of the outer circumferential support platform or a radially inner surface of the inner circumferential support platform, and a plurality of gap-maintaining features disposed between the plurality of outer or inner circumferential support platforms and the plurality of impingement plates. Each gap-maintaining feature of the plurality of gap-maintaining features is provided at a height such that a cooling air flow space is maintained between the plurality of outer or inner circumferential support platforms and the plurality of impingement plates.

In another embodiment, by way of example only, a method for manufacturing a turbine nozzle assembly includes the steps of forming an inner circumferential support platform, forming an outer circumferential support platform, and disposing a plurality of airfoil vanes between the inner circumferential support platform and the outer circumferential support platform. Further, the method includes disposing a plurality of impingement plates along a radially outer surface of the outer circumferential support platform or along or a radially inner surface of the inner circumferential support platform and providing a plurality of gap-maintaining features between the plurality of outer or inner circumferential support platforms and the plurality of impingement plates. Each gap-maintaining feature of the plurality of gap-maintaining features is provided at a height such that a cooling air flow space is maintained between the plurality of outer or inner circumferential support platforms and the plurality of impingement plates.

In yet another embodiment, by way of example only, a method of cooling a turbine nozzle assembly includes the steps of directing a flow of cooling air toward an impingement plate, the impingement plate being disposed along a radially outer surface of a circumferential outer support platform or along or a radially inner surface of the inner circumferential support platform of the turbine nozzle assembly, directing the flow of cooling air through a plurality of impingement holes in the impingement plate, and directing the flow of cooling air circumferentially along the radially outer surface of the circumferential outer support platform or along or a radially inner surface of the inner circumferential support platform and within a space formed between the outer or inner support platform and the impingement plate. Further, the method includes maintaining a constant height of the space with a plurality of gap-maintaining features formed between the outer or inner support platform and the impingement plate and directing the flow of cooling air into an opening within the outer or inner support platform, the opening providing an entrance into a cooling circuit of an airfoil vane of the turbine nozzle assembly.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Generally, the inventive subject matter relates to improved turbine nozzles and methods for manufacturing the same. The embodiments described herein provide a turbine nozzle vane design in which a minimum gap between the impingement plate thereof and the platform outer surface thereof is maintained, particularly in the vicinity of the vane cooling passage entry, such that the cooling flow pressure inside the vane cooling passages is at all times higher than the external gas-path pressure to insure positive outflow through the film holes on the pressure side wall of the vane to avoid vane burn through. The inventive subject matter is described in greater detail below.

Figure 1:
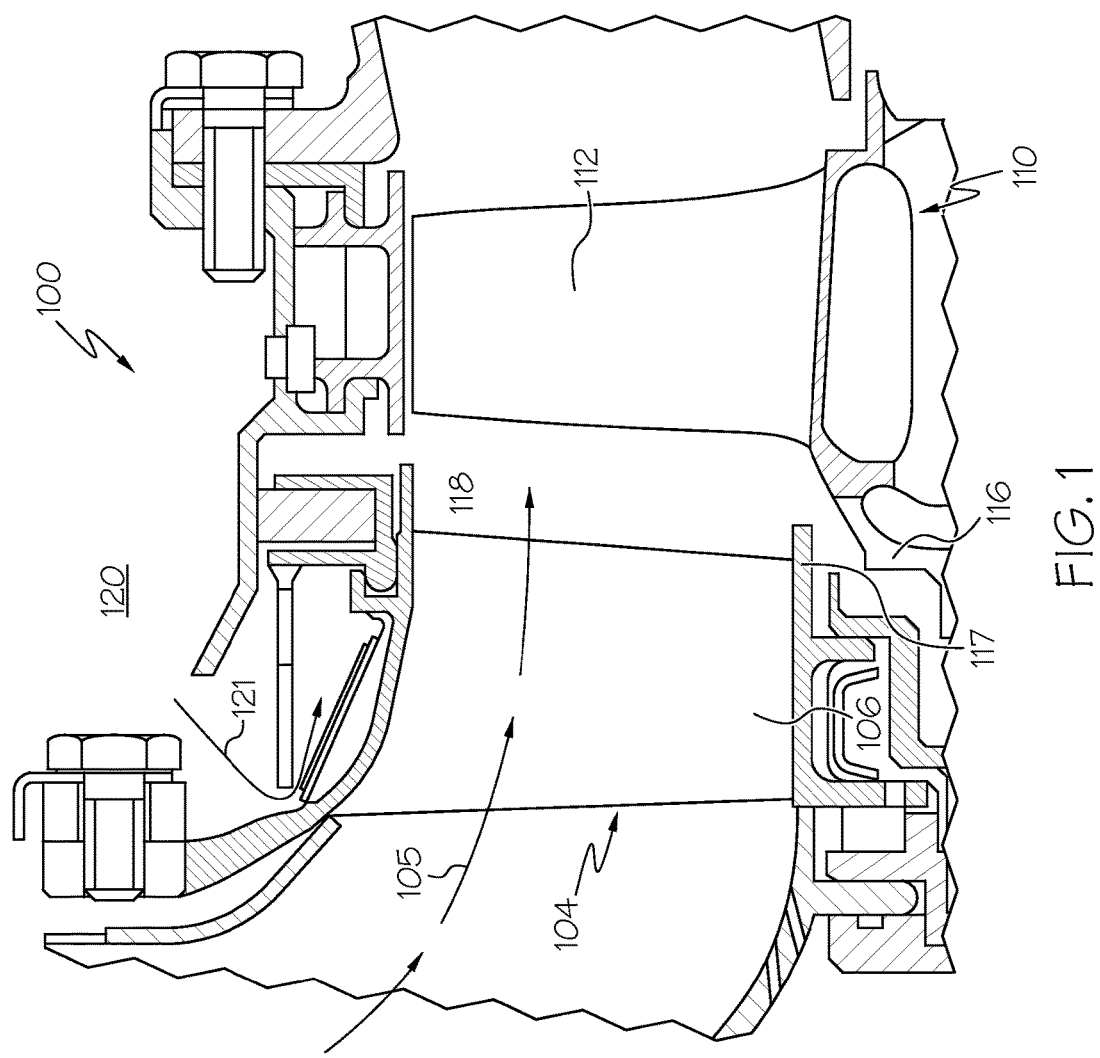
FIG. 1 is a cross-sectional side view of a turbine section of an engine, according to an embodiment.

An example of a system including the turbine nozzle is depicted in FIG. 1. FIG. 1 is a cross-sectional side view of a portion of a turbine section 100 of an engine, according to an embodiment. The turbine section 100 receives high temperature (e.g., a temperature typically in the range of 1100-1800° C. or higher) gases from an upstream engine combustor (not shown) to produce energy for the engine and/or components coupled to the engine. The turbine section 100 includes a turbine nozzle 104 that has a plurality of static vanes 106 (only one of which is shown) that direct the gases from the combustor to a turbine rotor 110. According to an embodiment, the turbine rotor 110 includes a plurality of blades 112 (only one of which is shown) that are retained in axial position by a retention plate 116. When the blades 112 are impinged upon by the gases (arrow 105), the gases cause the turbine rotor 110 to spin. According to an embodiment, an inner circumferential support platform 117 and an outer circumferential support platform 118 surround the static vanes 106 and define a portion of a combustor plenum 120. The combustor plenum 120 receives bleed air (arrow 121) from a compressor section (not shown), which may be directed through one or more openings in the outer circumferential support platform 118 towards the plurality of static vanes 106 to cool that static vanes 106.

Figure 2:
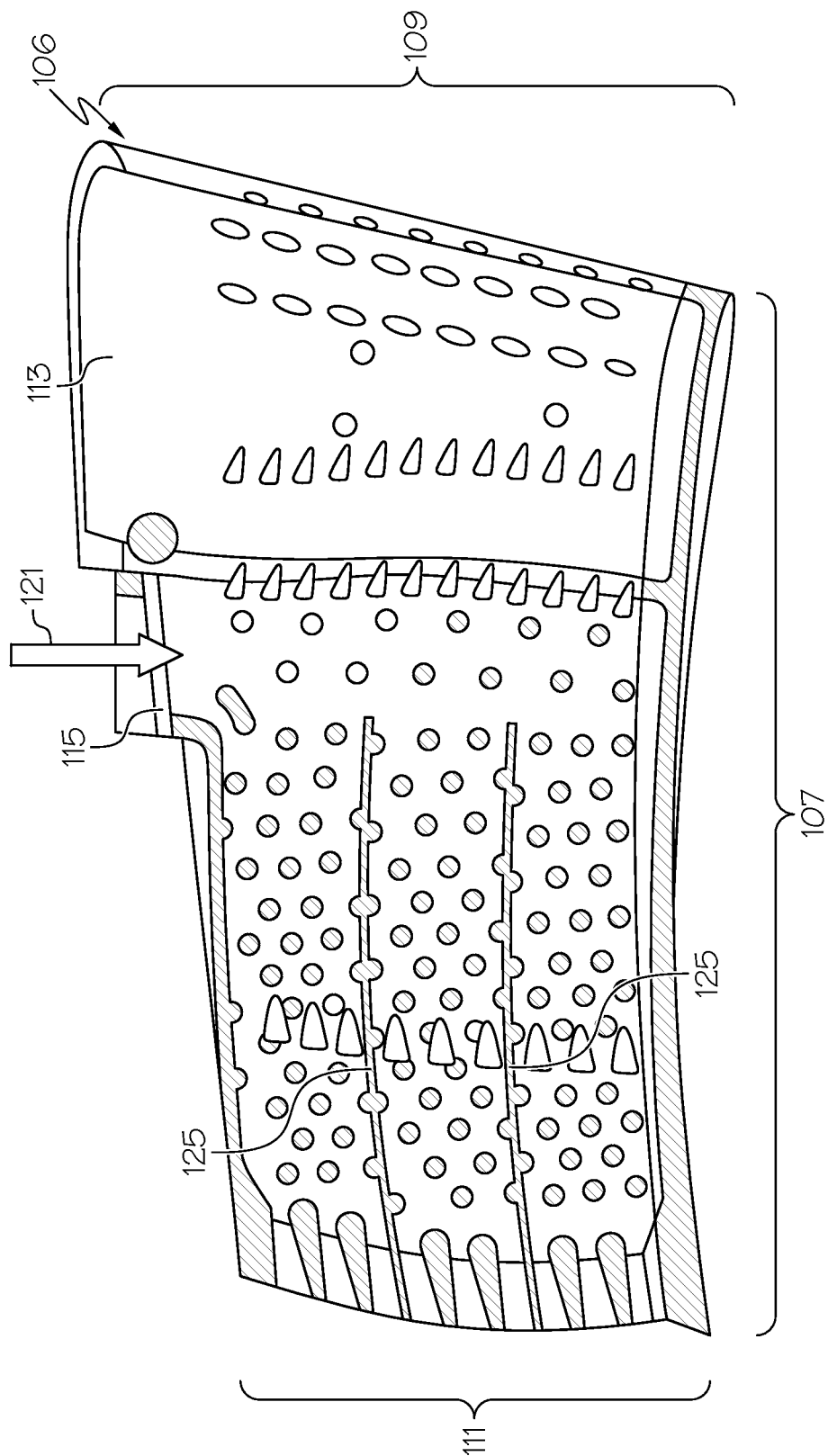
FIG. 2 is a cross-sectional side view of a portion of a turbine nozzle vane, according to an embodiment.

FIG. 2 is a cross-sectional side view of a portion of the turbine nozzle vane 106, according to an embodiment. Each vane 106 includes an airfoil 107, a first end 109, and a second end 111. The airfoil 107 has two outer walls 113 (only one of which is shown), each having outer surfaces that define an airfoil shape. The airfoil shape includes a leading edge at first end 109, a trailing edge at second end 111, a pressure side along the first outer wall 113, and a suction side along the second outer wall (not shown). In some embodiments, as shown, the vane 106 has an internal cooling circuit formed therein, which may extend from an opening 115 through the vane 106 and may include various passages that eventually communicate with openings 125 or other openings (not shown) that may be formed in the vane 106. Compressed air (arrow 121) that bypasses the combustor travels from the plenum 120 into the cooling circuit, as shown. Each vane additionally includes a leading end cooling circuit, into which cooling air that does not go through impinge plate 130 enters via opening 135 (shown in FIG. 4).

Figure 3:
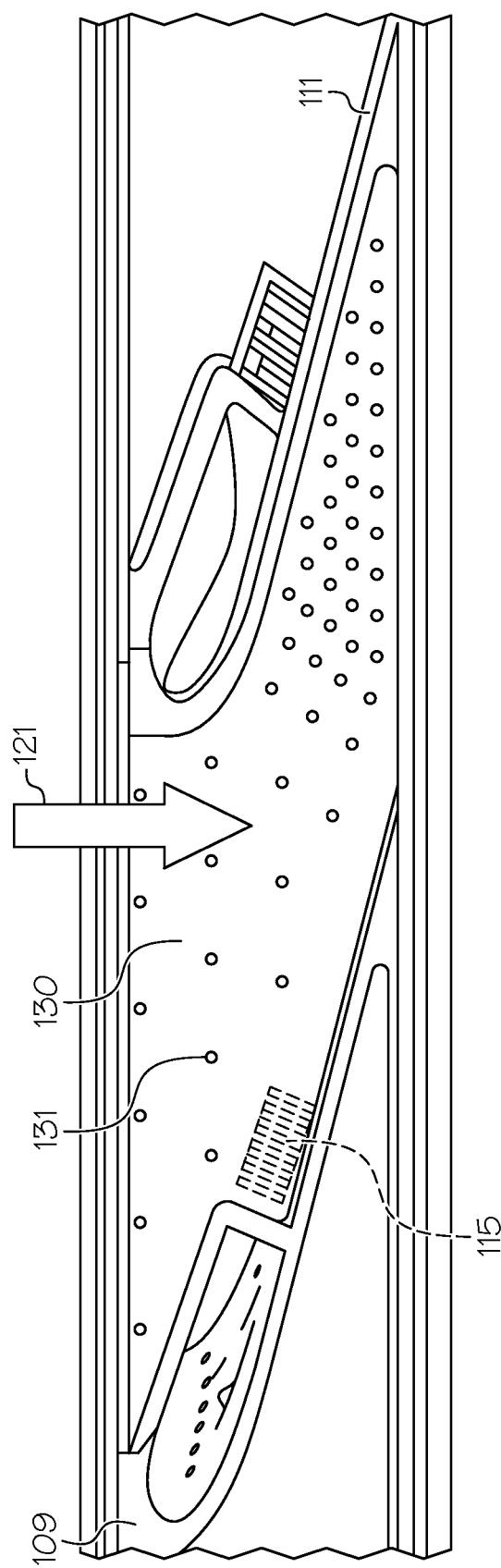
FIG. 3 is a top view of the turbine nozzle vane shown in FIG. 2.
Figure 4:
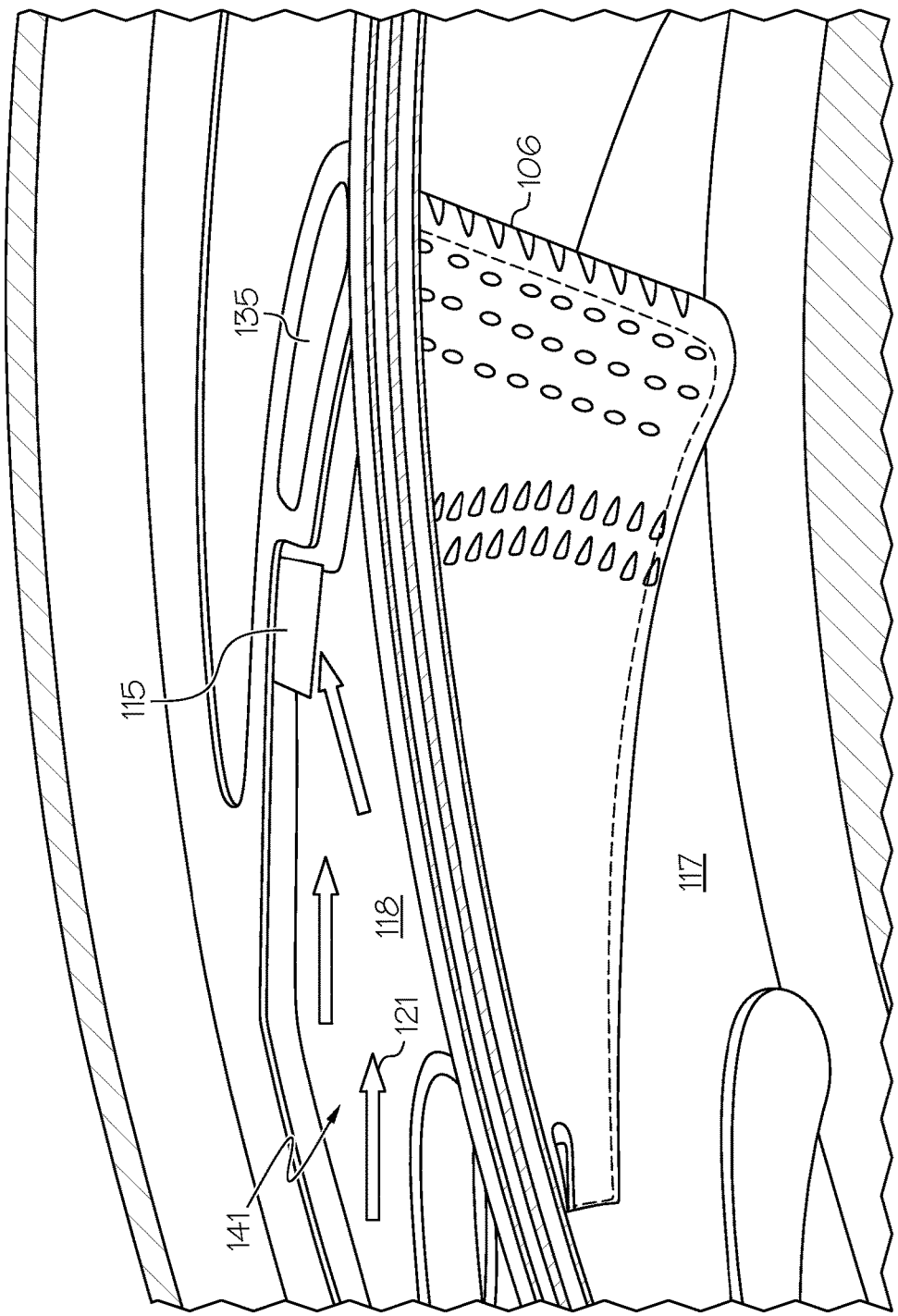
FIG. 4 is a perspective view of the turbine nozzle vane as in FIGS. 2 and 3, including the inner and outer rings.

There are different means by which the turbine cooling flow requirements can be minimized One way is to utilize advanced cooling designs based on highly efficient schemes such as film cooling and/or impingement cooling. Other means of reducing cooling flow include reusing the same cooling flow to cool different parts of the turbine components. FIGS. 2 through 4 show a typical example of such a novel cooling scheme employed to cool turbine nozzles by using an advanced cooling scheme in combination with reusing the cooling flow to cool different parts of the nozzle, as detailed below.

With reference particularly to FIG. 3, compressor bleed air (arrow 121) is used to cool the outer support platform 118 of the nozzle through an impingement cooling scheme. That is, cooling air is directed towards an impingement plate 130, which includes a plurality of impingement holes 131 that allow the cooling air to enter into a small "gap" between the impingement plate 130 and the outer support platform 118. Subsequently, part of the same cooling air is used to film cool the outer support platform 118 by ejecting the cooling air flow through a series of holes (not shown) on the gas-path side of the platform 118. The remainder of the cooling air post impingement cooling is fed through the opening 115 in the outer support platform 118 into the cooling passages that are cast inside the vane 106 to cool the vane itself. The cooling air then goes through cooling passages inside the vane 106 and cools the vane 106 through an internal convection cooling scheme before it is ejected into the mainstream gas-path through the trailing edge slots or film cooling holes 125 on the pressure side wall 113 of the vane 106, as shown schematically in FIG. 2.

Nozzle outer platform impingement cooling is achieved by employing impingement plates 130 that are welded or brazed to the side wall of the outer support platform 118. The impingement plates are usually fabricated out of thin sheet metals with numerous small apertures or impingement holes 131 in the plate 130 that direct the compressor bleed air (arrow 121) in a normal direction towards the outer surface of the outer support platform 118 to achieve impingement cooling. In order to maximize the impingement cooling coverage of the outer support platform 118 surface, the impingement holes 131 are drilled at smallest possible size to maximize the number of holes 131 for a given cooling flow rate. However, the impingement cooling heat transfer is known to be optimum at a small impingement height (distance between the impingement plate 130 and the outer surface of the outer support platform 118) to impingement hole 131 diameter ratio. Thus, in the case of small impingement hole 131 diameter size, the normal distance between the plate 130 and outer support platform 118 outer surface is reduced to maintain adequate impingement height to hole diameter ratios.

As will be appreciated, during the transient engine operating conditions, the vane 106 is exposed to hot gasses, and as the gas temperature changes during the transient operation, it expands and contracts when heated and cooled at different operating points. However, the vane 106 expands and contracts at a different rate than the impingement plate 130 that is attached to it, since the plate 130 is only exposed to cold compressor air at different operating conditions. Because the impingement plate 130 is normally welded to the outer support platform 118, there is a differential in the expansion and contraction rate that tends to cause a plastic deformation in the impingement plate 130. In some extreme cases, the deformed impingement plate 130 may collapse onto the outer support platform 118 outer surface.

With reference now to FIG. 4, the cooling air flow subsequent to passing through the impingement plate 130 (which is not illustrated) is shown. The cooling air (arrow 121) passes through a "gap" or cavity 141 between the impingement plate 130 (not shown) and the outer support platform 118 outer surface. Because the spent air after impingement is directed through this "gap" or cavity 141 formed between the impingement plate 130 and outer surface of the outer support platform 118 to enter into the vane cooling passage (via opening 115), the reduction in gap 141 between the plate 130 and platform 118 outer surface, particularly in the vicinity of the cooling passage entrance region 115, would result in significant loss of cooling air pressure. Subsequently, the air enters the vane 106 interior cooling passages at a lower pressure level, which in some instances might be lower than the external gas path pressure (air flow 105).

In the case of turbine nozzle cooling designs that employ film cooling on the pressure side wall 113 of the vane 106, the coolant pressure inside the vane 106 cooling passages must be higher than that in the gas-path side in order to push the flow out of the film holes 125. If the cooling air pressure inside the vane 106 cooling passages, post platform impingement cooling, is lower than the gas-path pressure, then there is a possibility of hot gas entering the vane cooling passages through film cooling holes 125 on the pressure side wall 113 of the vane 106 rather than the cooling flow going out of the film holes 125. In such cases, the hot gas ingestion into the vane 106 would result in excessively high vane 106 metal temperatures, which in some cases may exceed the melting temperatures of metal alloy.

For example, recent evaluations of turbine nozzles have revealed that some of the nozzles have burnt trailing edges while others of the same assembly did not. Hardware inspection post failure revealed that the nozzles that had burnt trailing edges had very small gap (i.e., gap 141) between the impingement plate and outer surface of the outer support platform, whereas the nozzles that did not have trailing edge burn through had an adequate gap between the impingement plate and the vane platform outer surface.

As such, embodiments of the present disclosure are directed to a turbine nozzle configuration in which a minimum gap between the impingement plate and the outer support platform outer surface is maintained, particularly in the vicinity of the nozzle cooling passage entry, such that the cooling flow pressure inside the nozzle cooling passages is at all times higher than the external gas-path pressure to insure positive outflow through the film holes on the pressure side wall of the nozzle to avoid nozzle burn through.

As noted above, there is a certain acceptable minimum gap between impingement plate and outer surface of the vane platform on which the flow impinges that results in a minimum acceptable cross sectional area at the entrance region of the nozzle cooling passage that the cooling flow would go through as it turns and enters the nozzle cooling passage. This acceptable minimum gap in the vicinity of the nozzle cooling passage entry point ensures the cooling flow does not lose too much pressure as it enters the cooling passage. The maximum allowed pressure loss at the entrance of cooling passage is set by ensuring that the pressure inside the cooling passage is always higher than the gas-path pressure for positive outflow of the coolant at film cooling hole locations. It is expected that a person having ordinary skill in the art will readily be able to determine such design considerations, based on the size and configuration of the turbine nozzle.

Figure 5:
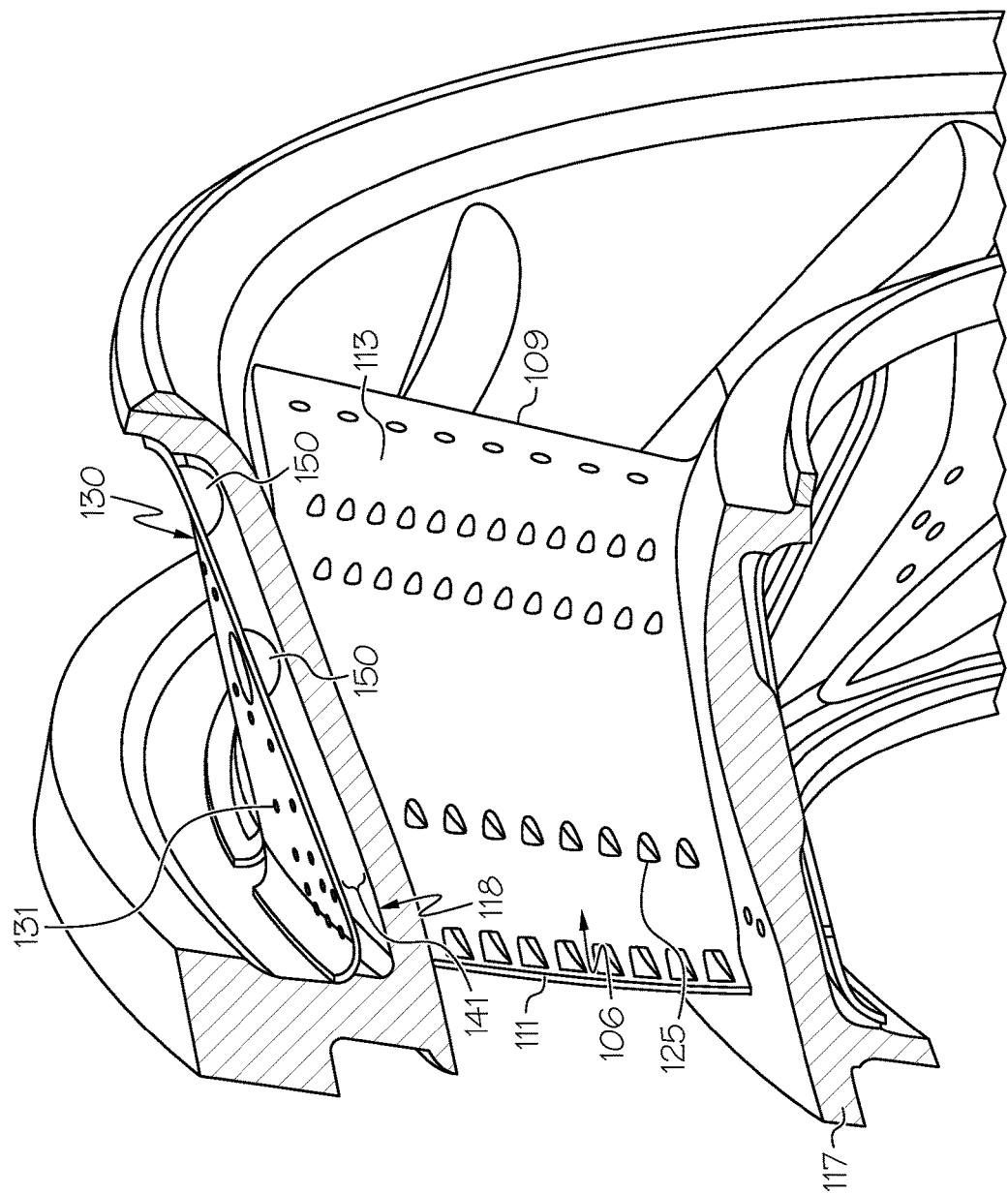
FIG. 5 is a cross-sectional view through the inner and outer rings of a turbine nozzle showing vane with a cooling feature in accordance with various embodiments of the present disclosure.
Figure 6:
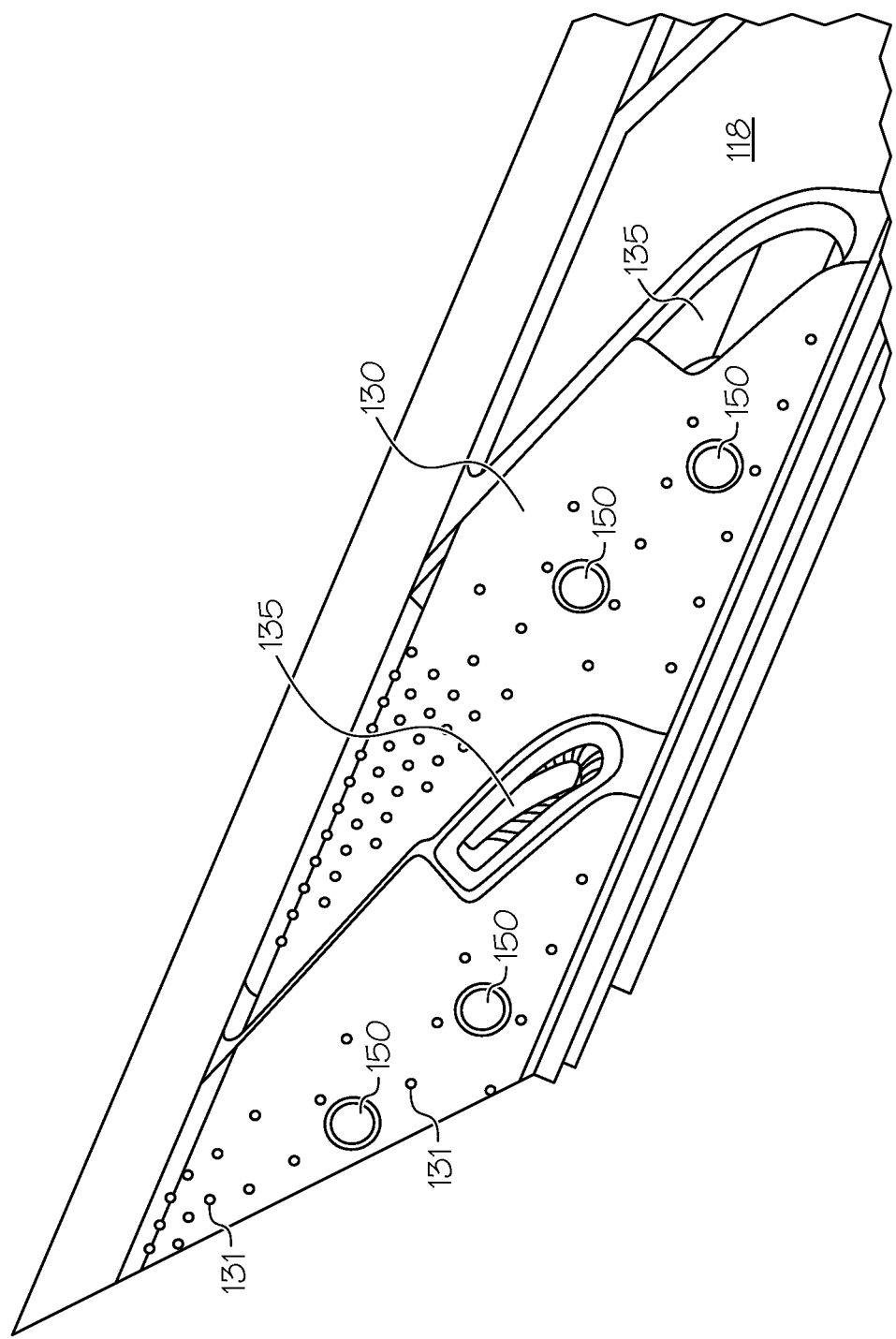
FIG. 6 is a top-view of the nozzle and cooling feature shown in FIG. 5.

Once the minimum allowed gap between the impingement plate and the platform outer surface has been identified, this gap is ensured by introducing one or more gap-maintaining features either on the impingement plate or on the outer support platform outer surface. Reference is now made to FIGS. 5 and 6, which illustrate one exemplary embodiment of a turbine nozzle design including a plurality of gap-maintaining features formed into the impingement plate 130 to maintain adequate gap spacing between the impingement plate 130 and the outer platform 118 outer surface. As shown in FIG. 5, in one exemplary embodiment, the gap-maintaining features are provided in the form of "dimples" (i.e., hemispherical depressions in the plate 130) that are added on the impingement plate 130 in the vicinity of (i.e., in one example, within about 1 mm to about 5 mm of) the vane cooling passage entrance 115 such that the dimple depth is at least equal to the minimum allowable gap 141. In this case the minimum gap 141 is maintained under all circumstances, since the dimples 150 will always act as a stop point between the impingent plate 130 and the platform outer surface 118.

While the gap-maintaining features 150 are provided in the form of "dimples" in this embodiment, it will be appreciated that any gap-maintaining feature shape would be suitable, as long as they are provided at a depth of at least the minimum allowable gap 141. Further, while the Figures illustrate two gap-maintaining features provided in each impingement plate 130, it will be appreciated that one or more features may be provided, depending on the size and design of the impingement plates and the gap-maintaining features.

Figure 7:
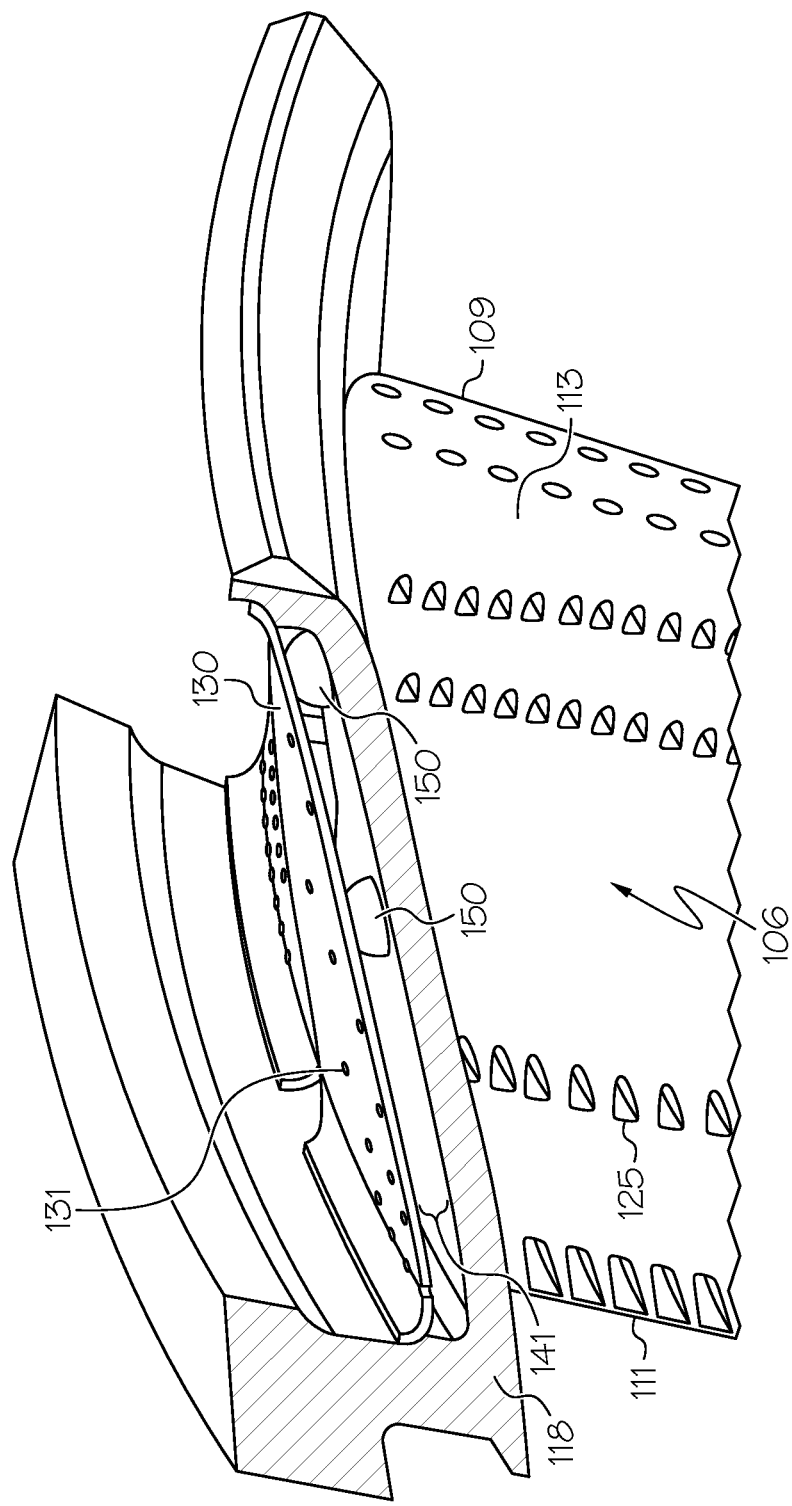
FIG. 7 is a cross-sectional view through the inner and outer rings of a turbine nozzle showing vane with a cooling feature in accordance with further embodiments of the present disclosure.

An alternative embodiment of the present disclosure is illustrated in FIG. 7. As shown therein, the gap-maintaining features may alternatively be provided on the outer surface of the outer support platform 118 in the close proximity of (i.e., in one example, within about 1 mm to about 5 mm of) the cooling passage entrance region 115 with the height of the gap-maintaining features 150 equal to or greater than the minimum allowed gap between the plate 130 and outer support platform 118 outer surface. In this manner, the gap 141 between the plate 130 and platform 118 surface will be prevented from deforming lower than minimum allowed since the plate 130 can only get close to the platform 118 surface up to the height of the gap-maintaining features 150.

In some instances, it has been found that the latter approach is more desirable (FIG. 7), since the gap-maintaining features 150 augment the convective heat transfer rate of the cooling flow as it traverses through the gap 141 formed between the impingement plate 130 and the outer support platform 118 outer surface before it enters into the cooling passage 115 inside the vane 106. It is also less expensive, in practice, to introduce this cast feature on the outer support platform 118 as opposed to performing the extra operation of creating dimples on every impingement plate 130. In this manner, the process is more robust and repeatable.

The manufacturing process for generating gap-maintaining features 150, for example dimples, in the impingement plate 130 starts by making the plate 130 out of thin sheet metal. The impingement hole 131 pattern is then drilled through the plate 130. The locations of the dimples 150 are related to the entrance location 115 of the cooling passage in the vane 106. Since the dimples 150 in the plates 130 are stamped in a die to form the desired shape and height prior to welding the plates 130 onto the vane assembly, the location of the cooling passage entry has to be identified on the plate and then the dimples are produced around that location.

Further, as noted above, the manufacturing process for casting gap-maintaining features 150 on the outer support platform 118 outer surface is the same as the casting process for the platform itself. The gap-maintaining features 150 are just extra casting features added in the vicinity of the vane cooling passages 115 on the outer surface of the outer support platform 118.

In variations of the presently disclosed invention, the cooling air flow is directed not from the outer radius of the turbine but from the inner radius. In this manner, the impingement plates may be disposed along an inner radius of the inner support platform. The gap-maintaining features would thus be disposed between the inner support platform and the impingement plates disposed therealong. Other aspects of this embodiment remain as described above with regard to the earlier described embodiments.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine nozzle assembly comprising:
an inner circumferential support platform;
an outer circumferential support platform;
a plurality of airfoil vanes disposed between the inner circumferential support platform and the outer circumferential support platform, wherein each of the plurality of airfoil vanes includes a first, leading end cooling air passageway extending through a central core of each airfoil vane and a second, vane cooling air passageway leading to a vane cooling circuit within each airfoil vane;
a plurality of impingement plates comprising cooling impingement holes formed through the plates, the plurality of impingement plates being disposed along a radially outer surface of the outer circumferential support platform or a radially inner surface of the inner circumferential support platform, wherein the impingement plates are physically joined with the outer or inner circumferential support platform along a periphery of the impingement plates, wherein the periphery includes a cut-out edge of the impingement plates adjacent to an opening to the first, leading end cooling air passageway such that no portion of any impingement plate is disposed radially over any portion of the first, leading end cooling air passageway, while wherein each impingement plate is disposed radially over a respective one of the second, vane cooling air passageways; and
a plurality of gap-maintaining features disposed between the plurality of outer or inner circumferential support platforms and the plurality of impingement plates, wherein the plurality of gap-maintaining features are disposed within and inward from the periphery including inward from the cut-out edge, and wherein the cooling impingement holes surround all lateral sides of the gap-maintaining features with respect to the surface of the impingement plate,
wherein each gap-maintaining feature of the plurality of gap-maintaining features is provided at a height such that a cooling air flow space is maintained between the plurality of outer or inner circumferential support platforms and the plurality of impingement plates, and
wherein each gap-maintaining feature of the plurality of gap-maintaining features is disposed within 1 mm to 5 mm of a respective one of the second, vane cooling air passageways.

2. The turbine nozzle assembly of claim 1, wherein each impingement plate of the plurality of impingement plates comprises a plurality of cooling impingement holes.

3. The turbine nozzle of claim 2, wherein the plurality of gap-maintaining features are disposed within the periphery such that at least one gap-maintaining feature of the plurality of gap-maintaining features is disposed between two of the plurality of impingement holes, and wherein at least one of the two of the plurality of impingement holes is disposed between the cut-out edge of the periphery and the at least one gap-maintaining feature.

4. The turbine nozzle assembly of claim 1, wherein each vane of the plurality of airfoil vanes is disposed along a radially outer surface of the inner circumferential support platform and a radially inner surface of the outer circumferential support platform.

5. The turbine nozzle assembly of claim 4, wherein each vane of the plurality of vanes is disposed opposite each impingement plate of the plurality of impingement plates along opposite radial surfaces of the outer circumferential support platform.

6. The turbine nozzle assembly of claim 1, wherein the outer circumferential support platform comprises a plurality of cooling airflow openings that provide a passageway for cooling air to flow from the air flow space into a cooling circuit of the vane.

7. The turbine nozzle assembly of claim 1, wherein the plurality of gap-maintaining features are formed along an inner radial surface of each impingement plate of the plurality of impingement plates.

8. The turbine nozzle assembly of claim 1, wherein the plurality of gap-maintaining features are formed along an outer radial surface of the outer circumferential support platform.

9. The turbine nozzle assembly of claim 1, wherein the plurality of gap-maintaining features comprise a plurality of hemispherical dimple structures.

10. A method for manufacturing a turbine nozzle assembly comprising the steps of:
    forming an inner circumferential support platform;
    forming an outer circumferential support platform;
    disposing a plurality of airfoil vanes between the inner circumferential support platform and the outer circumferential support platform, wherein each of the plurality of airfoil vanes includes a first, leading end cooling air passageway extending through a central core of each airfoil vane and a second, vane cooling air passageway leading to a vane cooling circuit within each airfoil vane;
    disposing a plurality of impingement plates comprising cooling impingement holes formed through the plates, the plurality of impingement plates being along a radially outer surface of the outer circumferential support platform or along a radially inner surface of the inner circumferential support platform, wherein the impingement plates are physically joined with the outer or inner circumferential support platform along a periphery of the impingement plates, wherein the periphery includes a cut-out edge of the impingement plates adjacent to an opening to the first, leading end cooling air passageway such that no portion of any impingement plate is disposed radially over any portion of the first, leading end cooling air passageway, while wherein each impingement plate is disposed radially over a respective one of the second, vane cooling air passageways; and
    providing a plurality of gap-maintaining features between the plurality of outer or inner circumferential support platforms and the plurality of impingement plates, wherein the plurality of gap-maintaining features are disposed within and inward from the periphery including inward from the cut-out edge, and wherein the cooling impingement holes surround all lateral sides of the gap-maintaining features with respect to the surface of the impingement plate,
    wherein each gap-maintaining feature of the plurality of gap-maintaining features is provided at a height such that a cooling air flow space is maintained between the plurality of outer or inner circumferential support platforms and the plurality of impingement plates, and
    wherein each gap-maintaining feature of the plurality of gap-maintaining features is disposed within 1 mm to 5 mm of a respective one of the second, vane cooling air passageways.

11. The method for manufacturing the turbine nozzle assembly of claim 10, further comprising forming in each impingement plate of the plurality of impingement plates a plurality of cooling impingement holes.

12. The method for manufacturing the turbine nozzle assembly of claim 10, further comprising disposing each vane of the plurality of airfoil vanes along a radially outer surface of the inner circumferential support platform and a radially inner surface of the outer circumferential support platform.

13. The method for manufacturing the turbine nozzle assembly of claim 12, further comprising disposing each vane of the plurality of vanes opposite each impingement plate of the plurality of impingement plates along opposite radial surfaces of the outer circumferential support platform.

14. The method for manufacturing the turbine nozzle assembly of claim 12, further comprising forming in the outer circumferential support platform a plurality of cooling airflow openings that provide a passageway for cooling air to flow from the air flow space into a cooling circuit of the vane.

15. The method for manufacturing the turbine nozzle assembly of claim 12, further comprising forming the plurality of gap-maintaining features along an inner radial surface of each impingement plate of the plurality of impingement plates.

16. The method for manufacturing the turbine nozzle assembly of claim 12, further comprising forming the plurality of gap-maintaining features along an outer radial surface of the outer circumferential support platform.

17. The method for manufacturing the turbine nozzle assembly of claim 12, further comprising forming the plurality of gap-maintaining features as a plurality of hemispherical dimple structures.

\* \* \* \* \*